June 10, 1947.                    J. EVANS                      2,422,086
PULSE PRODUCING APPARATUS
Filed Dec. 20, 1943
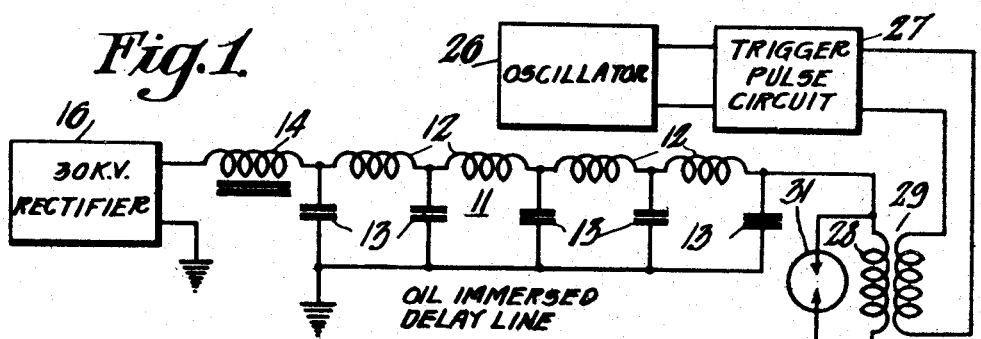
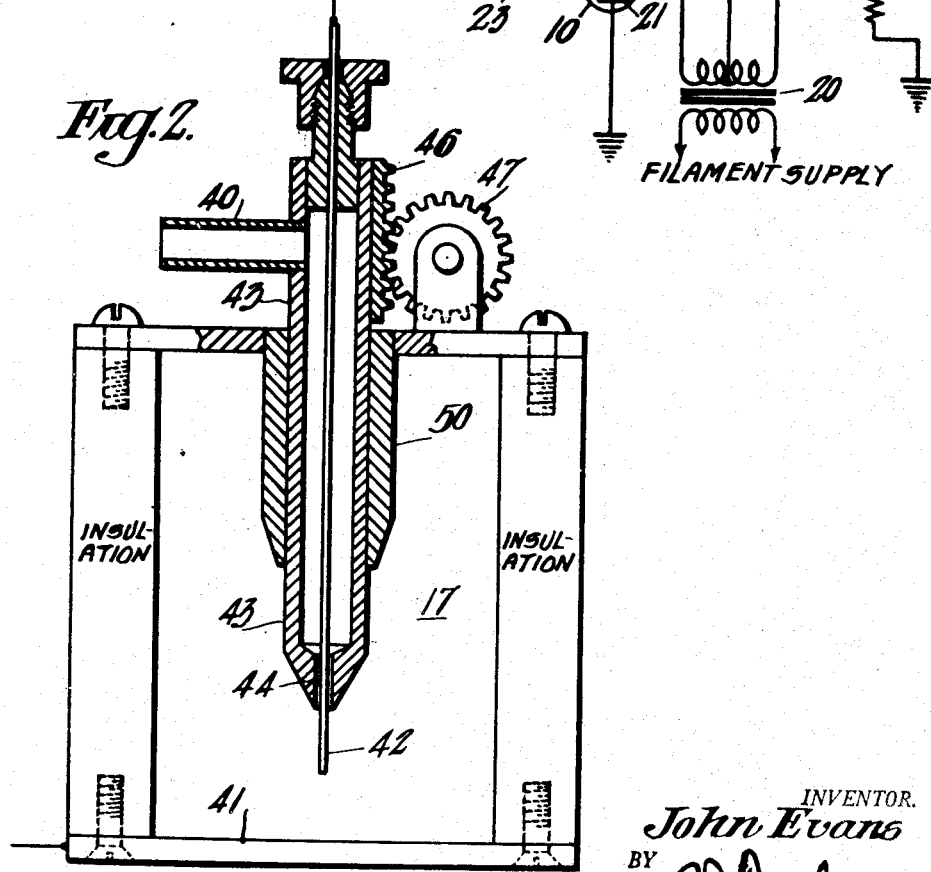
INVENTOR.
John Evans
BY Patented June 10, 1947

2,422,086

UNITED STATES PATENT OFFICE 2,422,086

PULSE PRODUCING APPARATUS

John Evans, Kingston, N. J., assignor to Radio Corporation of America, a corporation of Delaware Application December 20, 1943, Serial No. 515,057

7 Claims. (Cl. 171—97)

My invention relates to the production of electrical pulses and particularly to the use of spark gaps for discharging a pulse-forming line, a capacitor, or other charged circuit.

An object of the invention is to provide an improved method of and means for producting electrical pulses of very large instantaneous energy.

A further object of the invention is to provide an improved method of and means for periodically discharging a capacitor, a charged line, or the like.

A further object of the invention is to provide an improved spark discharge circuit for a pulse-forming system.

In a preferred embodiment of the invention a charged pulse-forming delay line is discharged through a main spark gap by applying in series with the delay line and the spark gap a trigger voltage of sufficient amplitude to break down the spark gap. The trigger voltage is applied through a transformer coil which is immediately short-circuited by an auxiliary spark gap in response to the breakdown of the main spark gap whereby the impedance of the transformer coil is effectively removed from the pulse-forming circuit.

The invention will be better understood from the following description taken in connection with the accompanying drawing in which Figure 1 is a block and circuit diagram of one embodiment of the invention, and Figure 2 is a side view, partly in section, of a preferred type of main spark gap for use in the circuit of Fig. 1. Similar parts in the two figures are indicated by similar reference characters.

Fig. 1 shows an embodiment of the invention as employed for pulse modulating a radio-frequency oscillator such as a magnetron 10. The pulse-forming circuit comprises a delay line 11 which may consist of series inductors 12 and shunt capacitors 13. The line 11 may be charged at one end through a choke coil 14 by a source 16 of high voltage direct current. This end of the delay line is reflecting since it is practically open-circuited so far as the modulating pulses are concerned.

The line 11 is discharged periodically through a main spark gap 17 whereby a high voltage pulse appears across an output resistor 18 and is applied through a filament transformer 20 to the cathode 19 and through ground to the anode 21 of the magnetron 10 to produce a pulse of radio-frequency energy. This R.-F. energy is picked up by a loop 22 and transmitted over a coaxial line 23 to a load circuit such as an antenna (not shown). The load impedance at the terminals of the load resistor 18 preferably is substantially the surge impedance of the delay line 11 whereby the discharge end of the line 11 is non-reflecting.

Periodically recurring trigger pulses are produced by suitable means such as an oscillator 26 and a pulse-forming circuit 27 and applied to the secondary 28 of a transformer 29. The secondary 28 is in series with one end of the delay line 11 and the main spark gap 17 whereby the trigger voltage raises the voltage across the gap 17 enough to make it break down. In the present example, the trigger pulse frequency is 10,000 cycles per second, each pulse having a duration of $1 \times 10^{-6}$ second as applied to the triggering transformer 29.

As soon as the main gap 17 breaks down, the voltage $Ldi/dt$ across the secondary 28 due to the rise of the main pulse causes the breakdown of an auxiliary spark gap 31 whereby the coil 28 is shunted or practically short-circuited by the gap 31. The spark gap 31 may be of any suitable construction and comprises point to point electrodes in the example illustrated. Thus, the impedance of the coil 28 is effectively removed from the discharge circuit so that it will not introduce transients or otherwise disturb the wave form of the pulse applied to the magnetron 10 or other load. As well known in the art, the pulses that are produced by discharging the line 11 have a width or duration determined by the time delay of the line 11. In the present example, this width is equal to the amount a wave is delayed when it travels down the line 11 and is reflected back. In the system being described, the modulating pulse peak output is approximately 1.3 megawatts with a pulse width at the top of the pulse of $1 \times 10^{-6}$ second.

Fig. 2 shows a preferred construction for the main spark gap 17. The two spark gap electrodes consist of a plane surface 41 which may be of stainless steel and a point electrode 42 which preferably is of tungsten. Compressed air is supplied through an inlet tube 40 to a tube 43 supporting the electrode 42 and is blown through the space 44 between the electrode 42 and the tube 43 whereby the electrodes 41 and 42 are cooled and whereby the ionized gas is blown away from the gap to increase the stability and rectifying ability of the spark gap. The air pressure is not critical. From six to fourteen pounds pressure is satisfactory. A rack 46 and pinion 47 are provided for sliding the tube 43 in a supporting sleeve 50 to adjust the gap length.

Preferably the point electrode diameter is small (0.06 inch) with respect to the gap electrode spacing (0.591 inch) so that a cold discharge takes place about the point electrode and a small "dark" current exists through the gap. When the voltage is increased, the cold discharge gives away abruptly to a continuous discharge. With a fixed electrode spacing, as long as the air pressure is maintained constant, the gap ionizing potential is precise and repeats within an error of plus or minus two percent at 30 kv. Thus, the condition of ionization and the resulting breakdown of the gap may be caused under these conditions by a slight over-voltaging of the gap.

I claim as my invention:

1. In combination, a circuit comprising at least one capacitor, means for charging said circuit, and means for discharging said circuit, said last means comprising a spark gap, an impedance element and a load circuit, all connected in series with each other and in series with said capacitor circuit, means for applying a voltage across said impedance element to over-voltage and break down said spark gap, and means for short-circuiting said impedance element in response to the breakdown of said gap.

2. In combination, a circuit comprising at least one capacitor, means for charging said circuit, and means for discharging said circuit, said last means comprising a point-to-plane spark gap, an inductance coil and a load circuit, all connected in series with each other and in series with said capacitor circuit, means for applying a voltage across said coil to over-voltage and break down said spark gap, and means for short-circuiting said coil in response to the breakdown of said gap.

3. In combination, a circuit comprising at least one capacitor, means for charging said circuit, and means for discharging said circuit, said last means comprising a spark gap, a transformer secondary coil and a load circuit, all connected in series with each other and in series with said capacitor circuit, means including the primary coil of said transformer for applying a voltage to said secondary coil to over-voltage and break down said spark gap, and means for short-circuiting said secondary coil in response to the breakdown of said gap.

4. In combination, a pulse-forming delay line, means for charging said line, and means for discharging said line at a periodic rate, said last means comprising a main spark gap, an inductance coil and a load circuit all connected in series with each other and in series with said delay line, means for applying voltage pulses to said coil for over-voltaging said main spark gap with the pulses occurring at said periodic rate, and an auxiliary spark gap connected across said coil and adjusted to break down in response to the breakdown of the main spark gap.

5. In combination, a pulse-forming delay line, means for charging said line, and means for discharging said line at a periodic rate, said last means comprising a point-to-plane spark gap, an inductance coil and a load circuit all connected in series with each other and in series with said delay line, means for applying voltage pulses to said coil for over-voltaging said main spark gap with the pulses occurring at said periodic rate, and short-circuiting means connected across said coil and adjusted to short said coil in response to the breakdown of the main spark gap.

6. In combination, a pulse-forming delay line, means for charging said line, and means for discharging said line at a periodic rate, said last means comprising a point-to-plane spark gap, an inductance coil and a load circuit all connected in series with each other and in series with said delay line, means for applying voltage pulses to said coil for over-voltaging said main spark gap with the pulses occurring at said periodic rate, and short-circuiting means connected across said coil and adjusted to short said coil in response to the breakdown of the main spark gap, said spark gap being adjusted to maintain a cold discharge from the point electrode during the periods intermediate successive discharges of said line.

7. The invention according to claim 6 wherein means is provided for blowing compressed air past the point electrode toward the plane electrode.

JOHN EVANS.